(12) United States Patent
Karmakar et al.

(10) Patent No.: US 12,314,421 B2
(45) Date of Patent: May 27, 2025

(54) RANSOMWARE SAFE FILESYSTEM (RSFS)

(71) Applicant: International Business Machines Corporation, Armonk, NY (US)

(72) Inventors: Anirban Karmakar, Midnapore Town (IN); Ganeswara Viswa Srimaan Amam, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 18/220,882

(22) Filed: Jul. 12, 2023

(65) Prior Publication Data

US 2025/0021686 A1    Jan. 16, 2025

(51) Int. Cl.
*G06F 21/62* (2013.01)
*G06F 21/51* (2013.01)
*G06F 21/56* (2013.01)

(52) U.S. Cl.
CPC .......... *G06F 21/6227* (2013.01); *G06F 21/51* (2013.01); *G06F 21/56* (2013.01)

(58) Field of Classification Search
CPC ...... G06F 21/62; G06F 21/6227; G06F 21/51; G06F 21/56
See application file for complete search history.

(56) References Cited

U.S. PATENT DOCUMENTS

| | | | | |
|---|---|---|---|---|
| 7,774,610 B2* | 8/2010 | McGovern | ............ | G06F 21/80 713/180 |
| 8,478,798 B2* | 7/2013 | Uhrhane | ............ | G06F 21/6218 707/822 |
| 10,491,398 B2* | 11/2019 | Heurich | ............ | H04L 63/12 |
| 10,938,854 B2 | 3/2021 | Strogov et al. | | |
| 11,341,244 B2 | 5/2022 | Aurélien et al. | | |
| 2007/0150874 A1* | 6/2007 | Sharma | ............ | G06F 21/53 717/136 |
| 2020/0412525 A1 | 12/2020 | Katsak et al. | | |
| 2021/0117540 A1 | 4/2021 | Seongnam et al. | | |
| 2021/0288790 A1 | 9/2021 | Beck et al. | | |

(Continued)

FOREIGN PATENT DOCUMENTS

| | | | | | |
|---|---|---|---|---|---|
| CN | 109196511 A | * | 1/2019 | .......... | G06F 11/3006 |
| CN | 117454440 A | * | 1/2024 | | |
| GB | 2588552 A | * | 4/2021 | ........... | G06F 21/121 |

(Continued)

*Primary Examiner* — Jayesh M Jhaveri
(74) *Attorney, Agent, or Firm* — Maeve M. Carpenter

(57) ABSTRACT

A method for preventing unauthorized access to a filesystem begins by configuring a data table in association with the filesystem. The table comprises a set of metadata for each application registered to access the filesystem. A filesystem driver uses information in the table to manage access to the filesystem. In particular, and in response to receipt of a filesystem access initiated by a requesting application, the driver first verifies the integrity of the data table. If table integrity is verified, the driver then determines whether the requesting application is registered in the data table and is permitted to have access to the filesystem using the particular metadata included in the data table when the application was registered. If evaluation of the set of metadata establishes that the requesting application is registered and is permitted access, the access is permitted; otherwise, the requesting application access is blocked.

20 Claims, 5 Drawing Sheets

(56) References Cited

U.S. PATENT DOCUMENTS

2022/0350914 A1 11/2022 Moore et al.
2023/0034169 A1 2/2023 Ferenczi

FOREIGN PATENT DOCUMENTS

| IL | 172054 A | 9/2012 |
| WO | 2018156800 A1 | 8/2018 |
| WO | 2018225070 A1 | 12/2018 |

* cited by examiner

RANSOMWARE SAFE FILESYSTEM (RSFS)

BACKGROUND OF THE INVENTION

Technical Field

This disclosure relates generally to data access methods and system and, in particular, to protecting data within a filesystem from ransomware attack.

Background of the Related Art

In today's modern digital age, the compromise or theft of data can have severe consequences on individuals, governments, enterprises, and cloud environments. Capitalizing on data as the new digital currency, cybercrime has become a big money business, with criminals stealing millions of credit card numbers and holding data ransom, costing businesses millions of dollars to regain access to their data. In face of the alarming rate and scope of recent attacks, new approaches are needed to effectively identify and dissuade attackers trying to steal or destroy their targets' crown jewels.

Existing approaches to prevent data theft only work under special circumstances. For example, current ransomware protections focus on preventing malware from running, maintaining backups, or trying to reverse engineer custom cryptography schemes. Unfortunately, such reactive approaches have been proven inadequate, as nearly two-thirds of companies attacked by ransomware still have their files successfully encrypted, with less than half being able to recover from backups.

Once malware has infected a computer system, it quickly establishes a foothold to persist across reboots. Furthermore, malware hides from system users and anti-virus software by blending into the system, covering its tracks, and masking its presence. Many of the techniques that malware uses to persist and hide within a system leave forensic markers on the filesystem that can be analyzed to identify the malware, and to learn about its activities. That said, techniques to extract such information requires file access mediation, or conducting system event-level collection and analysis, which is computationally-inefficient and intrusive.

Moreover, by the time ransomware is detected and confirmed it is usually too late to mitigate the attack effectively, as at least some fraction of the compromised information (i.e., the data that has been encrypted by the ransomware) is already consumed. At this point, recovery typically involves attempting to recover the encrypted data without any negotiation/payment of ransom, or attempting to decrypt or find the decryption key, e.g., via brute force or statistical analysis methods. These approaches, however, are heuristic-based and are inefficient or computationally expensive.

BRIEF SUMMARY

The approach herein solves the above-described problems by providing for a specialized filesystem that prevents any unauthorized access to the data stored within that filesystem. To this end, the filesystem is provided with a set of authentication, authorization and access control capabilities that successfully block any possibility of ransomware attacks on production data stored therein. For convenience of explanation, this filesystem is referred to herein as a "Ransomware Safe Filesystem" (RSFS). This nomenclature is not intended to be limiting, however, as the techniques herein are useful to prevent any unauthorized access to data stored in the filesystem (whether from ransomware or an application that is otherwise legitimate but that is being leveraged for an attack). The access control is implemented typically as a filesystem driver, which is referred to herein for convenience of explanation as the "RSFS driver." As will be seen, the access control is focused on controlling applications from accessing the filesystem as a whole, as opposed to controlling specific access to a file or directory therein. In particular, the filesystem driver is made aware of a set of legitimate (registered) applications that are required/permitted to have access to the file system contents. Then, and for every request for access to the filesystem contents (e.g., open, opendir, etc.), the filesystem driver attempts to validate the application against a list of the registered applications that are granted access to the data. After a successful validation, the request for access is granted; otherwise, the access request is denied.

Access to the filesystem by the filesystem driver preferably leverages a special data structure that is stored in association with the filesystem. This data structure is referred to herein as an RSFS data table, and it stores the list of registered applications together with metadata that enables the RSFS driver to perform its authentication, authorization and access control. In particular, the RSFS filesystem driver controls access to the filesystem using information in the RSFS data table. Preferably, the filesystem and the data table are hosted as an encrypted container (volume) in a storage media, and the data table is only accessible (e.g., to update the information therein) during a first operating mode (registration) when the container is unlocked and the filesystem is not mounted. During a second operating mode (input/output (I/O)) when the container is located and the filesystem is mounted, the filesystem driver uses the data table for determining whether the filesystem access from a requesting application is permitted.

According to an embodiment, a method for preventing unauthorized access to a filesystem begins by configuring the data table in association with the filesystem. Preferably, the data table comprises a set of metadata for each of one or more applications that are registered to access the filesystem. In this embodiment, the set of metadata comprises: a binary path of the application, a permitted filesystem access mode, a hash value generated by applying to the application a cryptographic hashing function (e.g., an SHA-1 hash algorithm), and a signature computed over the hash value. Preferably, the signature is generated by applying a private key of a public key pair to the hash value. The private key has an associated public key. In addition, preferably the data table stores a table signature generated by applying the private key over the set of metadata for all of the applications (e.g., the hash values for all of the then-registered application(s) as identified in the data table).

In the above-described embodiment, and in response to receipt of a filesystem access mode operation initiated by a requesting application, the RSFS driver first verifies the integrity of the data table itself using the table signature. If the integrity of the data table is verified, the RSFS driver then determines whether the requesting application is registered in the data table and is permitted to have access to the filesystem using the particular set of metadata that was included in the data table when the application was registered. If evaluation of the set of metadata establishes that the requesting application is registered and is permitted access, the access is permitted; otherwise, the requesting application access is blocked. When the filesystem access is blocked, the RSFS driver may also take an additional action, e.g., issuing a notification to another security system that the requesting application is ransomware, logging the access request, sandboxing the requesting application, initiating a request for further analysis of the requesting application, or the like.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
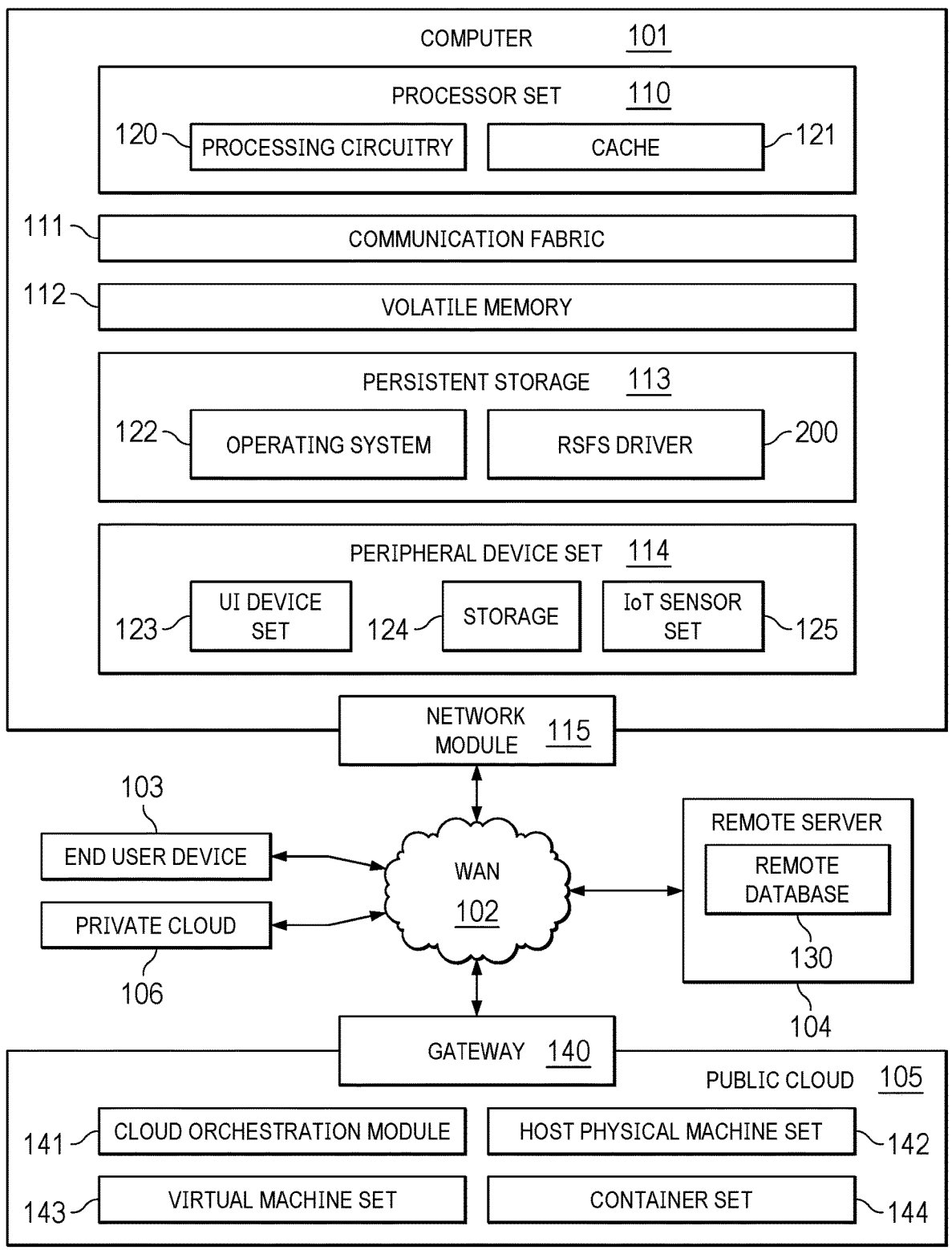
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the filesystem driver code 200 of this disclosure. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Ransomware Safe Filesystem (RSFS)

Figure 2:
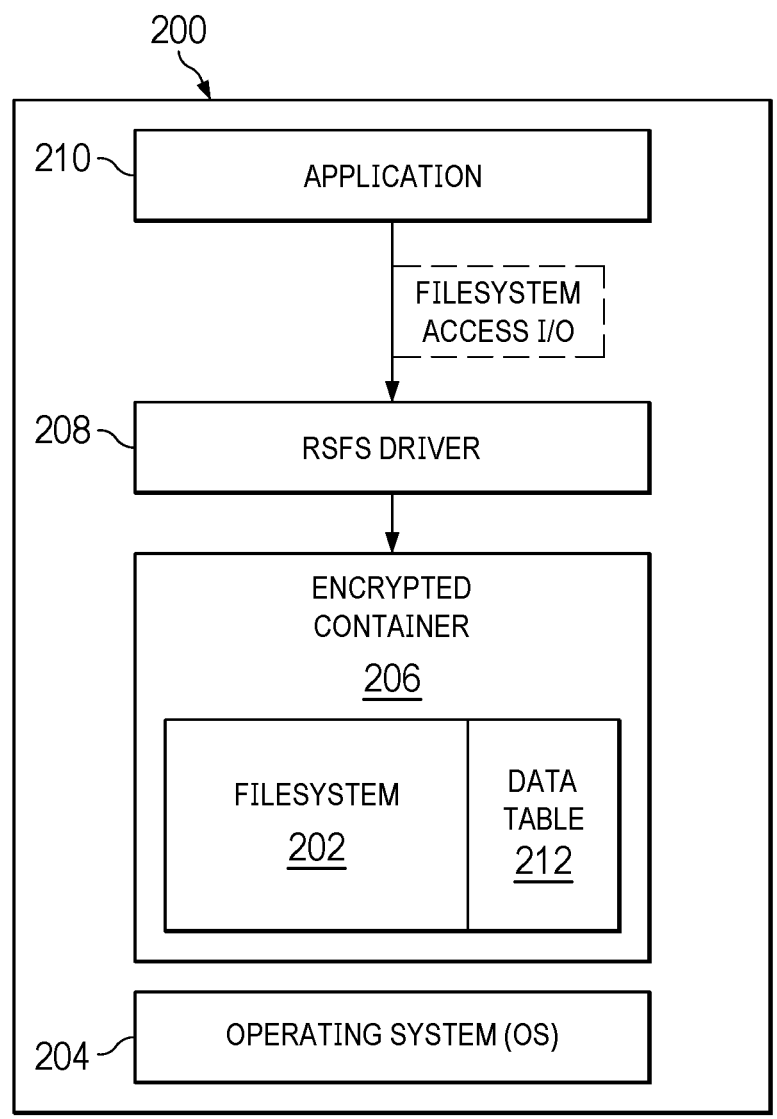
FIG. 2 depicts a representative implementation of a Ransomware Safe Filesystem (RSFS) according to the techniques of this disclosure.

FIG. 2 depicts a representative computing system 200 having a filesystem 202 in which the techniques of this disclosure are implemented. This filesystem may be of any conventional type, e.g., block-based, object-based, network-based, or the like. A representative filesystem is an EXT4 journaling system, which is a popular filesystem used in UNIX®-based operating systems. The techniques herein are not limited to EXT4 or any particular filesystem or filesystem type, as the same architecture may be extended to support other popular filesystems such as XFS (which is part of the mainline Linux® operating system kernel), JFS (Journaled File System, originally created by IBM®), BTRFS (a copy-on-write filesystem for Linux), and many others. The computer system 200 may be implemented as depicted in FIG. 1 and as described above, and it includes an operating system (OS) kernel 204, such as the Linux kernel, Microsoft® Windows® operating system, or the like. As depicted, preferably the filesystem 202 is housed within an encrypted container 206. As such, the filesystem data is by default encrypted, e.g., using a general filesystem encryption technique such as LUKS (Linux Unified Key Setup, for the Linux operating system kernel) or an equivalent. This prevents the filesystem from being mounted without the encryption key and ensures that the data within is not exposed to any application attempting to read the raw disk on which the filesystem resides. Once the filesystem 200 is mounted by the operating system 204, a filesystem driver 208 then controls access to the contents of the filesystem. As will be described below, and unlike known systems (e.g., UNIX-based OS) that check access permissions on directories or files and that used process identifiers (e.g., associated with the application 210) to decide whether to grant access or not, the filesystem driver 208 herein provides for a set of additional authentication, authorization and access control functions to enable the filesystem to act as a Ransomware Safe Filesystem (RSFS). Thus, filesystem driver 208 is identified in FIG. 2 as an RSFS driver. As will be described, RSFS driver 208 controls access to the filesystem as a whole (as opposed to on a file- or directory-specific basis) by one or more applications, e.g., application 210, and it does so by leveraging information in a special data structure that is associated with the filesystem 202. As depicted, the data structure is a data table 212, and in this embodiment the data table is supported as secure data in an additional metadata area of the EXT4 filesystem. The data table may be supported elsewhere in the computing system.

Although the preferred approach herein is to implement the authentication, authorization and access control functions (as explained in detail below) as a filesystem driver, this is not a limitation, as the particular functions may be implemented as standalone code, or as program code that is associated with some other program or process. The functionality may also comprise program code that is native to the operating system itself.

Figure 3:
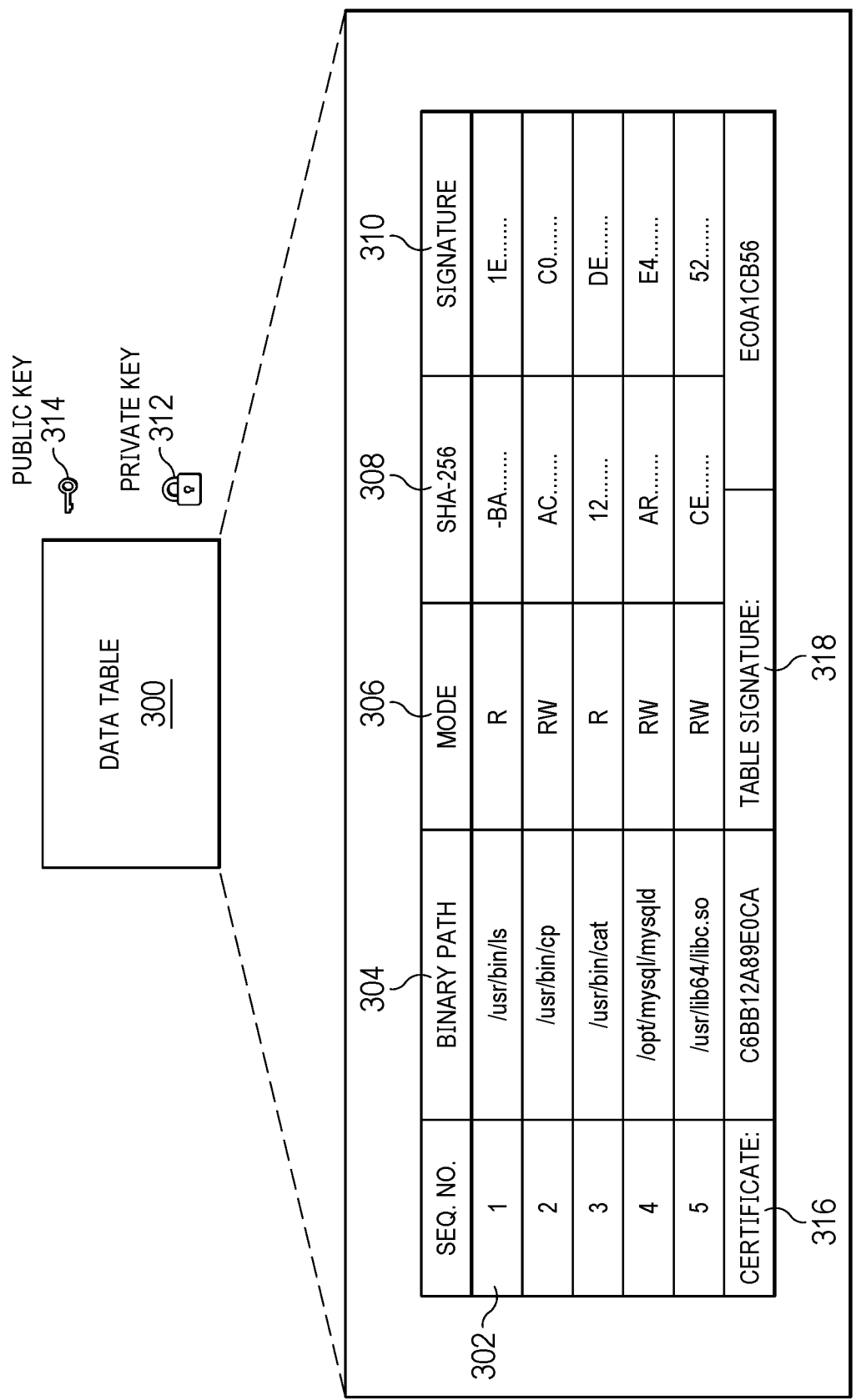
FIG. 3 depicts a representative configuration of the data table depicted in FIG. 2.

FIG. 3 depicts a preferred configuration and layout of the data table. As depicted, and in this embodiment, the data table 300 comprises, for each of one or more applications that have been registered to access the filesystem, a set of metadata. The set of metadata is a row 302 of the data table, and the individual metadata portions are each a column. In particular, the set of metadata for the registered application comprises a binary path of the application 304, a permitted filesystem access mode 306, a value 308 generated by applying to the application (typically the application binary) a cryptographic function, and a signature 310 computed over the value 308. Thus, in this example a first application (Seq.

No. 1) has the binary path " . . . /usr/bin/ls," an access mode of "read" (R), a hash value "-BA------," and a signature "1E------". The set of metadata associated with the second application (Seq. No. 2) has the binary path" . . . usr/bin/cp," an access mode of both "read" and "write" (RW), a hash value "AC--------," and a signature "C0--------."

Because the value 308 is generated by applying the cryptographic hash function, it is sometimes referred to herein as a hash value. In this embodiment, the signature 310 is computed by applying a private key 312 to the hash value 308. The private key 312 has a corresponding public key 314, and the private key and public key together comprise a public key pair (or public key cryptosystem). The private key 312 of the public key pair is uniquely associated with the filesystem. Because the signature 310 is computed using the private key of a public key cryptosystem, it is sometimes referred to as a digital signature. To prevent compromise, the private key 312 is stored outside of the system. The public key 314 of the public key pair is stored in a Certificate 316 that is also part of the data table 300. The public key 314 may also be stored in a certificate store (not shown) of the operating system. Finally, and as also depicted in FIG. 3, the data table 300 stores another digital signature, which is referred to herein as a table signature 318. Preferably, the table signature 318 is generated by applying the private key 312 over the set of metadata (e.g., the set of hash values 308) for all of the registered applications. Thus, the table signature 318 is the last data point computed for a particular version of the data table.

In a representative embodiment, the cryptographic function that is used to generate the hash value (per row) is a Secure Hash Algorithm, e.g., SHA-1. SHA is a family of cryptographic hash functions published by the National Institute of Standards and Technology (NIST). Other cryptographic hash functions of this type include Message Digest (MD) algorithms, such as MD-5. The public key cryptosystem (PKC) key pair is generated with a cryptographic algorithm, such as Rivest-Shamir-Adelman (RSA). Other PKC algorithms include Diffie Hellman (DH), Elliptic Curve Cryptography (ECC), and many others.

When the RSFS filesystem such as depicted in FIGS. 2 and 3 is newly-provisioned, the data table typically is empty. As a first step after the filesystem is provisioned, the private key 312 and the certificate (that includes the public key) 316 are provisioned, typically by a filesystem administrator. As noted, the private key is stored externally, e.g., in a trusted data store, external to the filesystem. The private key is needed whenever any updates are done to the secure area contents within the data table. To this end, as an application is registered by an administrator, the set of metadata for that application is then added to the data table. An update to the data table may also occur when a previously-registered application is removed, when an application's access rights are modified, and the like.

Figure 4:
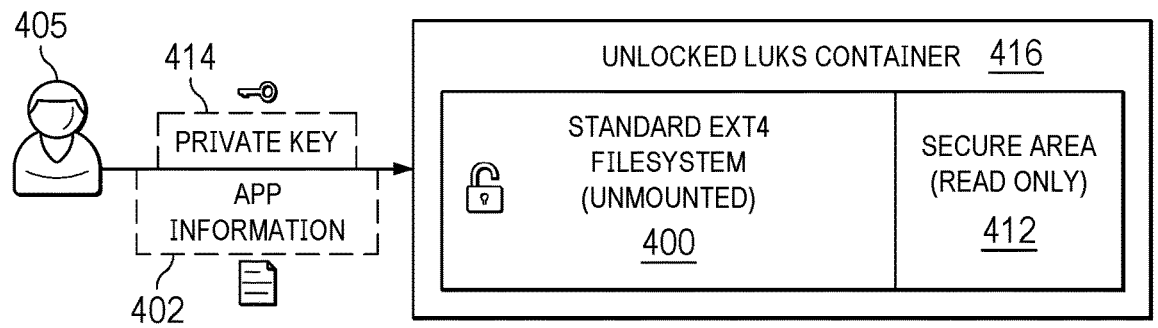
FIG. 4 depicts an application registration mode of operation of the RSFS.

FIG. 4 depicts the application registration process in additional detail. As noted above, preferably no application has RSFS-based access to the filesystem 400 initially. The administrator 405 acts to add any and all applications that need access to the filesystem by generating or otherwise obtaining the set of metadata 402 for each such application and causing that data to be written in the secure area, namely, data table 412. Preferably, there are two (2) distinct modes available for the RSFS, namely, an application (app) registration mode as depicted in FIG. 4, and an input/output mode described below. The app registration mode is active when the LUKS volume is unlocked (Unlocked LUKS container 416) and the RSFS is not mounted. The I/O mode is the general operation mode and, as will be described, it is activated when the filesystem 400 is mounted to the system. Typically, the above-mentioned operating modes are mutually-exclusive.

In particular, and when the RSFS filesystem is locked (i.e., the LUKS container is encrypted), the complete production data is protected from unauthorized access from any application. At this point the contained filesystem cannot be mounted and the data table is inaccessible to any application. After the LUKS container is unlocked using the LUKS encryption key (in this example embodiment), the filesystem is ready to be mounted. At this point, the data table 412 of the RSFS is in app registration mode for users to allow new applications to be added to the secure table. This table, however, cannot be updated without access to the private key. In particular, and as depicted, the administrator 405 needs to provide RSFS with the private key 414 and the set of metadata 402. As previously described, the set of metadata contains the path of the application binary and the allowed access rights for the said application. The private key 414 is required to generate the SHA signature (reference 310 in FIG. 3) and the final table signature (element 318 in FIG. 3). As will be described, these signatures are used by the filesystem driver for authenticating each application that is allowed to access the filesystem, as well as to verify the integrity of the secure area itself and make sure that only the filesystem administrator 405 and not any malicious user/ application has made the data table update(s). For any modification to the data table, the administrator needs to unmount the filesystem. Stated another way, the application registration to the filesystem is a one-time step that is done only by the administrator (or a delegate), and it requires the administrator to provide the private key for the operation. The administrator-provided private key is necessary for re-signing the table after any update done to table to ensure that table integrity can be maintained (and validated by the filesystem driver).

As depicted in FIG. 3 and explained above, the set of metadata associated with an application registration includes an access mode. The access mode typically is specified to the filesystem as "read-only," "write-only" or "read-write." This access right is for the filesystem as a whole and not to an individual file or directory. Thus, if an application is registered with read-only access, the application is not allowed to do any write operations to any stored entity in the filesystem irrespective of any file permission and application privileges.

Figure 5:
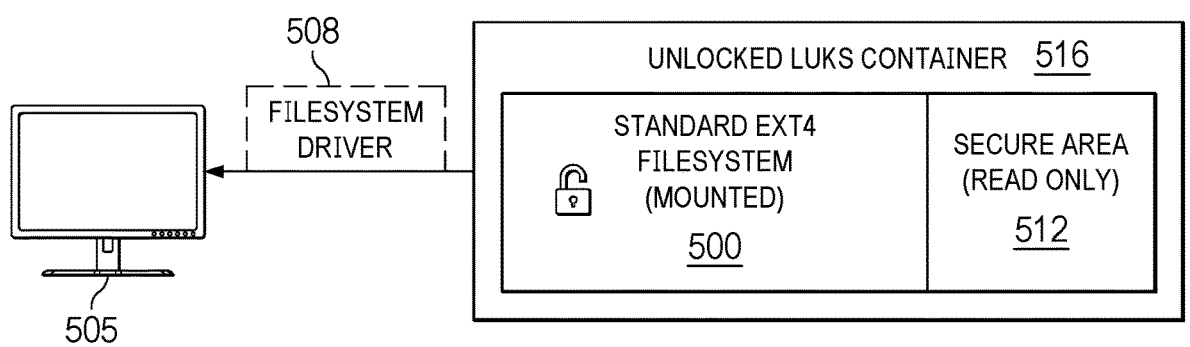
FIG. 5 depicts an input/output (I/O) mode of operation of the RSFS.

With reference now to FIG. 5, and with the RSFS filesystem in I/O-mode, the filesystem 500 in Unlocked LUKS Container 516 is mounted, and all I/O operations from the computer 505 are controlled by the RSFS driver 508. In this mode, any write access coming in for the secure area (the data table 512) are rejected. This ensures that the secure area is read-only. This is necessary because, when the filesystem is active, any read-write access that is allowed to the secure area causes race conditions when the RSFS driver is authenticating applications, and this could allow malicious applications to tamper with the file system metadata.

To protect the secure area in RSFS when mounted, preferably the filesystem driver loads a copy of the data table to the local computer system memory, and application authentication and authorization are done using this in-memory copy. When the filesystem driver receives a unmount request, it matches the content in memory to that present on the storage media to ensure the secure area has not been tampered with during runtime. If the filesystem driver detects any unauthorized modification done to the secure area, preferably it overwrites the tampered data with its own memory copy to restore the secure area back to its previous state.

When the RSFS driver receives an open request for a file or directory, the driver first checks the integrity of the secure access table by validating the secure area table signature. Then, the RSFS driver authenticates the application against the SHA-1 signature of the binary stored in the data table. The search is carried out based on the absolute path of the application as the primary key of the access control table. If the application entry in the data table is found and the SHA of the requesting application matches the stored SHA hash value, the application is authenticated. Following this, the mode requested by the application for the open call is evaluated to determine if it matches the access mode of the application in the table. If so, then the application's open request is granted. If any of the tests fail, the access request is denied. In association with any request denial, the RSFS driver may then an additional action, e.g., issuing a notification that the application is potential ransomware, sandboxing the application, logging a potential ransomware attack, and so forth.

Figure 6:
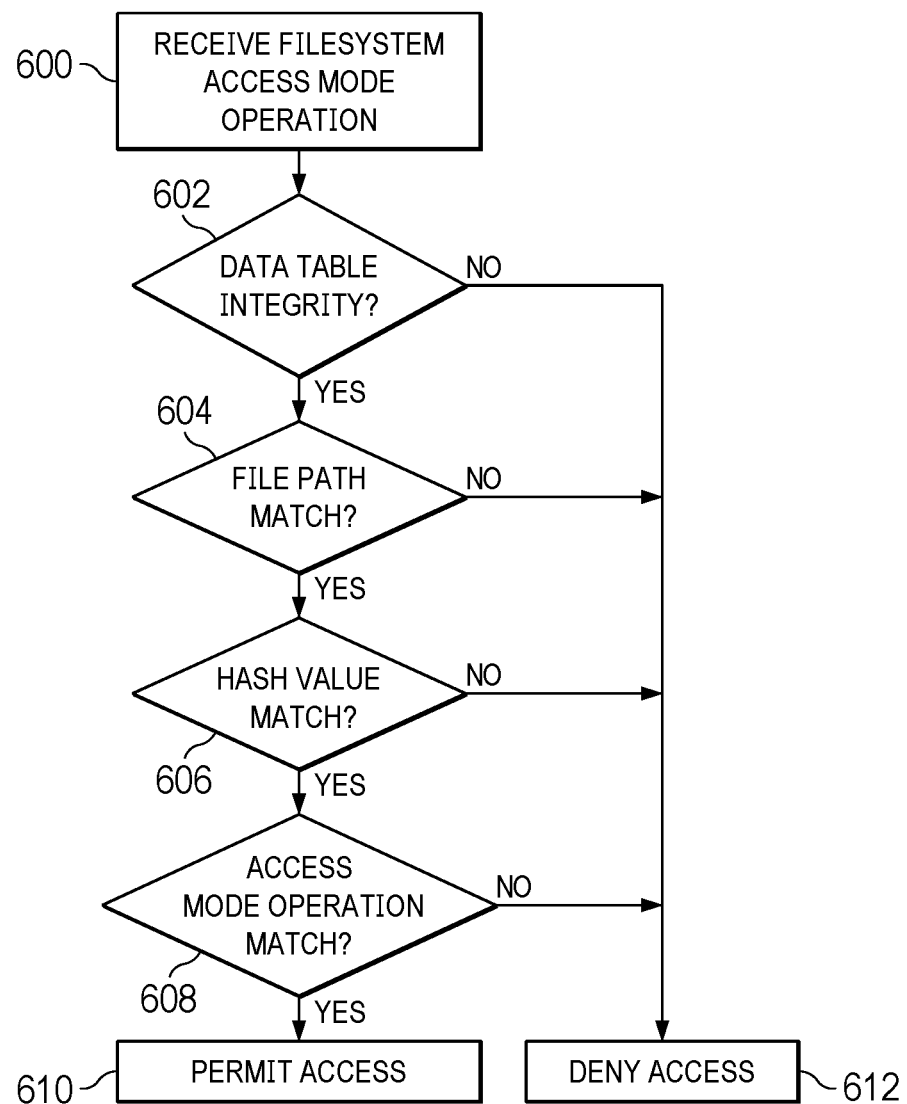
FIG. 6 depicts a process flow of the I/O mode of operation.

FIG. 6 is a process flow depicting the I/O mode of operation in detail. The depicted operation is carried out in response to receipt of a filesystem access mode operation initiated by a requesting application. The receipt of the filesystem access mode operation is step 600. At step 602, a test is performed to evaluate the integrity of the data table. This test involves applying the public key of the public key pair to the table signature. If the outcome of the test at step 602 indicates that the data table integrity is valid, the routine continues at step 604 to test whether a file path associated with the requesting application matches any binary path of an application as registered in the data table. If the outcome of the test at step 604 indicates that the requesting application matches to an application registered in the data table, the routine continues at step 606 to test whether a hash value computed over the requesting application matches the hash value previously computed for the registered application and stored in the data table. Thus, this check uses the same cryptographic function that was used to create the original hash value. If the outcome of the test at step 606 indicates that the requesting application matches the registered application, a final test is then performed at step 608 to determine whether the filesystem access mode operation initiated by the requesting application matches its permitted filesystem access mode as identified in the data table. If so, and at step 610, the filesystem driver permits the requesting application to access the filesystem. If, however, the outcome of any of the tests at steps 602, 604, 606 or 608 fail, then at step 612 the filesystem driver denies such access.

Preferably, and to improve performance, once a requesting application is found by the RSFS driver to have permitted access to the filesystem as described by the process flow in FIG. 6, any following I/O requests (i.e., to the already-opened file or directory) are subsequently granted without requiring a re-validation through the data table. This is because the possibility of the application getting infected at runtime after the initial RSFS authentication is successful is very low, as there are OS security mechanisms that make is virtually impossible to infect a running process on-the-fly.

The above-described technique provides significant advantages. The approach provides a filesystem-based protection strategy that strongly defends against any kind of malicious attack on production data, including ransomware. The approach is closely integrated to the system and does not depend on any heuristics. It protects important (and often critical) production data from malicious applications along with seamlessly allowing legitimate applications to read and modify the data. The approach protects the filesystem data not only from malicious applications but from any kind of unauthorized access irrespective of any system wide user privileges. Thus, even a root user or applications having root privileges (and that need not have access to the filesystem data) are prevented from accessing it. On the other hand, one or more legitimate applications (e.g., database software, web applications, etc., and which directly interact with the production data) have contained and secure access.

Further, the approach herein does not rely on file permission-based access control; rather, the access right enabled by the architecture is provided for the filesystem as a whole, and not with respect to individual files or directories therein. As such, the technique herein may also be used to complement conventional file permission-based access control.

Generalizing, the method according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes, and they are not meant to limit the scope of the described subject matter.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the filesystem and the filesystem driver code are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As already mentioned, the techniques disclosed herein are not limited to any particular cryptographic hash function such as SHA-1 or an RSA-based public key pair, but this will be a typical implementation. More generally, the approach herein may be implemented using any cryptographic hash function (e.g., MD-5), and any public key cryptosystem.

The techniques herein provide for improvements to another technology or technical field, namely, filesystems, security systems and devices, access control mechanisms, as well as improvements to the operational capabilities of such systems when used in the manner described.

The nature of the data that is protected in the filesystem is dependent on the application and is not intended to be limited. Further, and as previously mentioned, the techniques herein are not limited to any particular filesystem type.

What is claimed is:

1. A method for preventing unauthorized access to a filesystem, comprising:

maintaining a data table in association with the filesystem, the data table comprising, for each of one or more applications that have been registered to access the filesystem, a set of metadata comprising: a binary path of the application, a permitted filesystem access mode, a value generated by applying to the application a cryptographic function, and a signature computed over the value, the table also storing a table signature generated by applying a private key over the set of metadata for all of the applications, the private key having an associated public key;

responsive to receipt of a filesystem access mode operation initiated by a requesting application, applying the associated public key to the table signature to validate integrity of the data table;

upon validating integrity of the data table, determining whether the requesting application is registered in the data table and is permitted to have access to the filesystem; and upon determining that the requesting application is registered in the data table and is permitted to have access to the filesystem, permitting the requesting application to access the filesystem.

2. The method as described in claim 1 wherein the requesting application is determined to be registered and is permitted to have access to the filesystem by:

determining whether a path associated with the requesting application matches any binary path of an application as registered in the data table;

upon determining that the path associated with the requesting application matches the binary path of an application registered in the data table, determining whether a value computed over the requesting application using the cryptographic function matches the value associated with the application as registered in the data table; and upon determining that the value computed over the requesting application matches the value associated with the application as registered in the data table, determining whether the filesystem access mode operation initiated by the requesting application matches its permitted filesystem access mode as identified in the data table.

3. The method as described in claim 1 wherein the filesystem and the data table are stored as an encrypted container within a storage media.

4. The method as described in claim 3 wherein any change in the data table is permitted only when the encrypted container is unlocked and the filesystem is not mounted.

5. The method as described in claim 3 wherein the requesting application is permitted access to the filesystem only when the encrypted container is unlocked and the filesystem is mounted.

6. The method as described in claim 5 further including rejecting any write access request to the data table when the encrypted container is unlocked and the filesystem is mounted.

7. The method as described in claim 1 wherein the signature computed over the value for a registered application is generated by applying the private key over the value.

8. An apparatus, comprising:

a processor;

computer memory holding computer program instructions executed by the processor to prevent unauthorized access to a filesystem, the computer program instructions comprising program code configured to:

maintain a data table in association with the filesystem, the data table comprising, for each of one or more applications that have been registered to access the filesystem, a set of metadata comprising: a binary path of the application, a permitted filesystem access mode, a value generated by applying to the application a cryptographic function, and a signature computed over the value, the table also storing a table signature generated by applying a private key over the set of metadata for all of the applications, the private key having an associated public key;

responsive to receipt of a filesystem access mode operation initiated by a requesting application, apply the associated public key to the table signature to validate integrity of the data table;

upon validating integrity of the data table, determine whether the requesting application is registered in the data table and is permitted to have access to the filesystem; and upon determining that the requesting application is registered in the data table and is permitted to have access to the filesystem, permit the requesting application to access the filesystem.

9. The apparatus as described in claim 8 wherein the program code configured to determine whether the requesting application is registered in the data table and is permitted to have access to the filesystem includes program code further configured to:

determine whether a path associated with the requesting application matches any binary path of an application as registered in the data table;

upon determining that the path associated with the requesting application matches the binary path of an application registered in the data table, determine whether a value computed over the requesting application using the cryptographic function matches the value associated with the application as registered in the data table; and upon determining that the value computed over the requesting application matches the value associated with the application as registered in the data table, determine whether the filesystem access mode operation initiated by the requesting application matches its permitted filesystem access mode as identified in the data table.

10. The apparatus as described in claim 8 wherein the filesystem and the data table are stored as an encrypted container within a storage media.

11. The apparatus as described in claim 10 wherein the program code is further configured to permit a change in the data table only when the encrypted container is unlocked and the filesystem is not mounted.

12. The apparatus as described in claim 11 wherein the program code permits the requesting application to access the filesystem only when the encrypted container is unlocked and the filesystem is mounted.

13. The apparatus as described in claim 12 wherein the program code is further configured to reject any write access request to the data table when the encrypted container is unlocked and the filesystem is mounted.

14. The apparatus as described in claim 8 wherein the signature computed over the value for a registered application is generated by applying the private key over the value.

15. A computer program product in a non-transitory computer readable medium, the computer program product holding computer program instructions that, when executed by a processor in a host processing system, prevent unauthorized access to a filesystem, the computer program instructions comprising program code configured to:

configure a data table in association with the filesystem, the data table comprising, for each of one or more applications that have been registered to access the filesystem, a set of metadata comprising: a binary path of the application, a permitted filesystem access mode, a value generated by applying to the application a cryptographic function, and a signature computed over the value, the table also storing a table signature generated by applying a private key over the set of metadata for all of the applications, the private key having an associated public key;

responsive to receipt of a filesystem access mode operation initiated by a requesting application, apply the associated public key to the table signature to validate integrity of the data table;

upon validating integrity of the data table, determine whether the requesting application is registered in the data table and is permitted to have access to the filesystem; and upon determining that the requesting application is registered in the data table and is permitted to have access to the filesystem, permit the requesting application to access the filesystem.

16. The computer program product as described in claim 15 wherein the program code configured to determine whether the requesting application is registered in the data table and is permitted to have access to the filesystem includes program code further configured to:

determine whether a path associated with the requesting application matches any binary path of an application as registered in the data table;

upon determining that the path associated with the requesting application matches the binary path of an application registered in the data table, determine whether a value computed over the requesting application using the cryptographic function matches the value associated with the application as registered in the data table; and upon determining that the value computed over the requesting application matches the value associated with the application as registered in the data table, determine whether the filesystem access mode operation initiated by the requesting application matches its permitted filesystem access mode as identified in the data table.

17. The computer program product as described in claim 15 wherein the filesystem and the data table are stored as an encrypted container within a storage media.

18. The computer program product as described in claim 17 wherein the program code is further configured to permit a change in the data table only when the container is unlocked and the filesystem is not mounted.

19. The computer program product as described in claim 17 wherein the program code permits the requesting application to access the filesystem only when the container is unlocked and the filesystem is mounted.

20. The computer program product as described in claim 15 wherein the signature computed over the value for a registered application is generated by applying the private key over the value.

* * * * *